United States Patent
Hashimoto

[11] Patent Number: 5,681,077
[45] Date of Patent: Oct. 28, 1997

[54] REAR SEAT DEVICE FOR VEHICLE

[75] Inventor: Kazunori Hashimoto, Toyota, Japan

[73] Assignee: Toyota Jidosha Kabushiki Kaisha, Toyota, Japan

[21] Appl. No.: 679,468

[22] Filed: Jul. 9, 1996

[30] Foreign Application Priority Data

Sep. 22, 1995 [JP] Japan .................................. 7-244876

[51] Int. Cl.$^6$ ...................................................... B60N 2/30
[52] U.S. Cl. ...................... 297/15; 297/378.12; 296/65.1; 296/66; 296/69
[58] Field of Search ...................... 297/335, 326, 297/329, 334, 378.12, 15, 378.13; 296/65.1, 66, 69

[56] References Cited

U.S. PATENT DOCUMENTS

| | | | |
|---|---|---|---|
| 3,449,012 | 6/1969 | Caron | 297/378.12 |
| 4,536,027 | 8/1985 | Brennan | 297/378.12 |
| 4,708,385 | 11/1987 | Kondo | 297/378.13 |
| 5,240,392 | 8/1993 | Yoshida et al. | |
| 5,492,386 | 2/1996 | Callum | 296/65.1 |

FOREIGN PATENT DOCUMENTS

| | | | |
|---|---|---|---|
| 3719584 | 1/1988 | Germany | 296/65.1 |
| 59-63036 | 4/1964 | Japan . | |
| 59-193736 | 12/1984 | Japan . | |
| 60-1639 | 1/1985 | Japan . | |
| 3-125625 | 12/1991 | Japan . | |
| 5-85242 | 4/1993 | Japan . | |
| 2069592 | 6/1979 | United Kingdom | 297/335 |

*Primary Examiner*—Peter M. Cuomo
*Assistant Examiner*—Anthony D. Barfield
*Attorney, Agent, or Firm*—Cushman, Darby & Cushman IP Group of Pillsbury Madison & Sutro LLP

[57] ABSTRACT

A rear seat device for a vehicle disposed on a higher, rear section of a stepped floor surface of a vehicle, and provided so as to be rotatable by substantially 180 degrees toward a front of the vehicle, including: a rear seat back whose length is adjustable between a seating state length, which is a length of the rear seat back in an ordinary seating state for a vehicle occupant, and a folded-up state length, which is shorter than the seating state length.

18 Claims, 5 Drawing Sheets

REAR SEAT DEVICE FOR VEHICLE

FIELD OF THE INVENTION

The present invention relates to a rear seat device for a vehicle, and in particular, to a rear seat device for a vehicle which is disposed on the higher, rear section of a stepped floor surface of a vehicle, and which is rotatable toward the front of the vehicle.

DESCRIPTION OF THE RELATED ART

The structure disclosed in Japanese Utility Model Application Laid-Open (JP-U) No. 3-125625 is known as an example of a rear seat device for a vehicle which is disposed on the rear section of the floor surface of a vehicle.

As illustrated in FIG. 5, this rear seat device for a vehicle is provided with a cam hole 72 and an outer peripheral cam 74, which are formed at a pair of brackets 70, and a pivoting shaft 78 and a guide shaft 80, which are provided at a rear seat cushion 76 and oppose the cam hole 72 and the outer peripheral cam 74 respectively. The rear seat cushion 76 is movable with respect to a floor surface 82 between a first position (illustrated in FIG. 5), at which the rear seat cushion 76 is maintained substantially horizontally, a second position (not illustrated), at which the rear seat cushion 76 stands upright substantially vertically, and a third position (the position shown in FIG. 6), at which the rear seat cushion 76 is rotated 180 degrees toward the front of the vehicle.

As illustrated in FIG. 6, when the rear seat cushion 76 can be rotated together with a rear seat back 77 substantially 180 degrees toward the front of the vehicle with respect to the floor surface 82, in order for the rear seat cushion 76 and a front seat 84 to not interfere with each other, the distance from a center of rotation P1 of the rear seat cushion 76 to the front seat 84 is set longer than a radius of rotation R1 of the rear seat cushion 76.

However, in an ordinary rear seat device for a vehicle, the height of the rear seat back 77 is greater than the length of the rear seat cushion 76. Therefore, a radius of rotation R2 of the rear seat back 77 is greater than the radius of rotation R1 of the rear seat cushion 76.

Accordingly, the front seat 84 must be moved to its forwardmost position (i.e., to the position furthest toward the front of the vehicle). However, it has been difficult to employ this type of rear seat device for a vehicle in small automobiles in which the distance between the front seat 84 and a rear seat 86 cannot be made so large.

SUMMARY OF THE INVENTION

In view of the aforementioned, an object of the present invention is to provide a rear seat device for a vehicle in which a rear seat can be rotated substantially 180 degrees toward the front of the vehicle even in small automobiles.

A first aspect of the present invention is a rear seat device for a vehicle disposed on a higher, rear section of a stepped floor surface of a vehicle, and provided so as to be rotatable by substantially 180 degrees toward a front of the vehicle, including: a rear seat back whose length is adjustable between a seating state length, which is the length of the rear seat back in an ordinary seating state for a vehicle occupant, and a folded-up state length, which is shorter than the seating state length.

Accordingly, when the rear seat back is rotated substantially 180 degrees toward the front of the vehicle from the state in which the rear seat back is collapsed forward on the rear seat cushion, the rear seat back is placed in a folded-up state in which the length thereof is shorter than the length thereof in an ordinary seating state.

A second aspect of the present invention is a rear seat device for a vehicle in which, in the first aspect, the rear seat back is divided into two portions in a longitudinal direction thereof which are an upper portion, which is a rear seat back main body portion, and a lower portion, which is a rear seat back divisional portion, the rear seat back divisional portion and the rear seat back main body portion being connected at vicinities of respective surfaces thereof at a rear side of the vehicle in the ordinary seating state for a vehicle occupant, and the rear seat back divisional portion being provided so as to be rotatable toward a rear of the vehicle around a shaft, which extends in a transverse direction of the rear seat back, with respect to the rear seat back main body portion; and the rear seat device also includes a rear seat back rotating/sliding mechanism which allows the rear seat back main body portion to collapse forward onto a rear seat cushion and allows the rear seat back main body portion to slide in substantially longitudinal directions of the vehicle from a forward collapsed state.

In the second aspect of the invention, in the rear seat device for a vehicle of the first aspect, the seat back is divided into two portions: an upper portion and a lower portion. The upper portion is the rear seat back main body portion, and the lower portion is the rear seat back divisional portion. The rear seat back divisional portion is connected to the rear seat back main body portion so as to be rotatable toward the reverse surface of the rear seat back main body portion. Due to the rotating/sliding mechanism, the rear seat back main body portion can collapse forward onto the seat cushion and can slide in longitudinal directions of the vehicle.

Accordingly, in the state in which the rear seat back divisional portion has been rotated toward the reverse surface side of the rear seat back main body portion, the rear seat back main body portion collapsed forward on the seat cushion is slid toward the rear. The lengths of the seat back and the seat cushion are aligned, and the seat back and the seat cushion are rotated toward the front of the vehicle. Further, in the state in which the rear seat has been rotated substantially 180 degrees toward the front of the vehicle, the rear seat back divisional portion abuts the front section of the floor surface so as to maintain the folded-up rear seat.

In accordance with the above-described first aspect of the present invention, in a rear seat device for a vehicle disposed on a higher, rear section of a stepped floor surface of a vehicle and provided so as to be rotatable by substantially 180 degrees toward the front of the vehicle, the length of a rear seat back is adjustable between a seating state length, which is the length of the rear seat back in an ordinary seating state for a vehicle occupant, and a folded-up state length, which is shorter than the seating state length. Therefore, a superior effect is achieved in that, even in a small car, the rear seat can be rotated substantially 180 degrees toward the front of the vehicle so that a wide, flat luggage compartment can be provided continuously from the reverse surface of the rear seat cushion which has been rotated substantially 180 degrees toward the front of the vehicle, to the floor behind the rear seat.

In accordance with the second aspect of the present invention, in the rear seat device for a vehicle of the first aspect, the seat back is divided into two portions: an upper portion and a lower portion. The rear seat back divisional portion (the lower portion) is connected to the reverse surface of the rear seat back main body portion (the upper portion) so as to be rotatable. Due to the rotating/sliding mechanism, the rear seat back main body portion can be collapsed forward onto of the seat cushion and can be slid in longitudinal directions of the vehicle. Therefore, in addition to the effects of the first aspect of the invention, a superior effect is achieved in that there is no need to provide a supporting member to support the rear seat when the rear seat is rotated substantially 180 degrees toward the front of the vehicle.

DESCRIPTION OF THE PREFERRED EMBODIMENT

An embodiment of a rear seat device for a vehicle of the present invention will be described with reference to FIGS. 1 through 4.

In the figures, arrow FR points toward the front of the vehicle, whereas arrow UP points toward the top of the vehicle.

Figure 1:
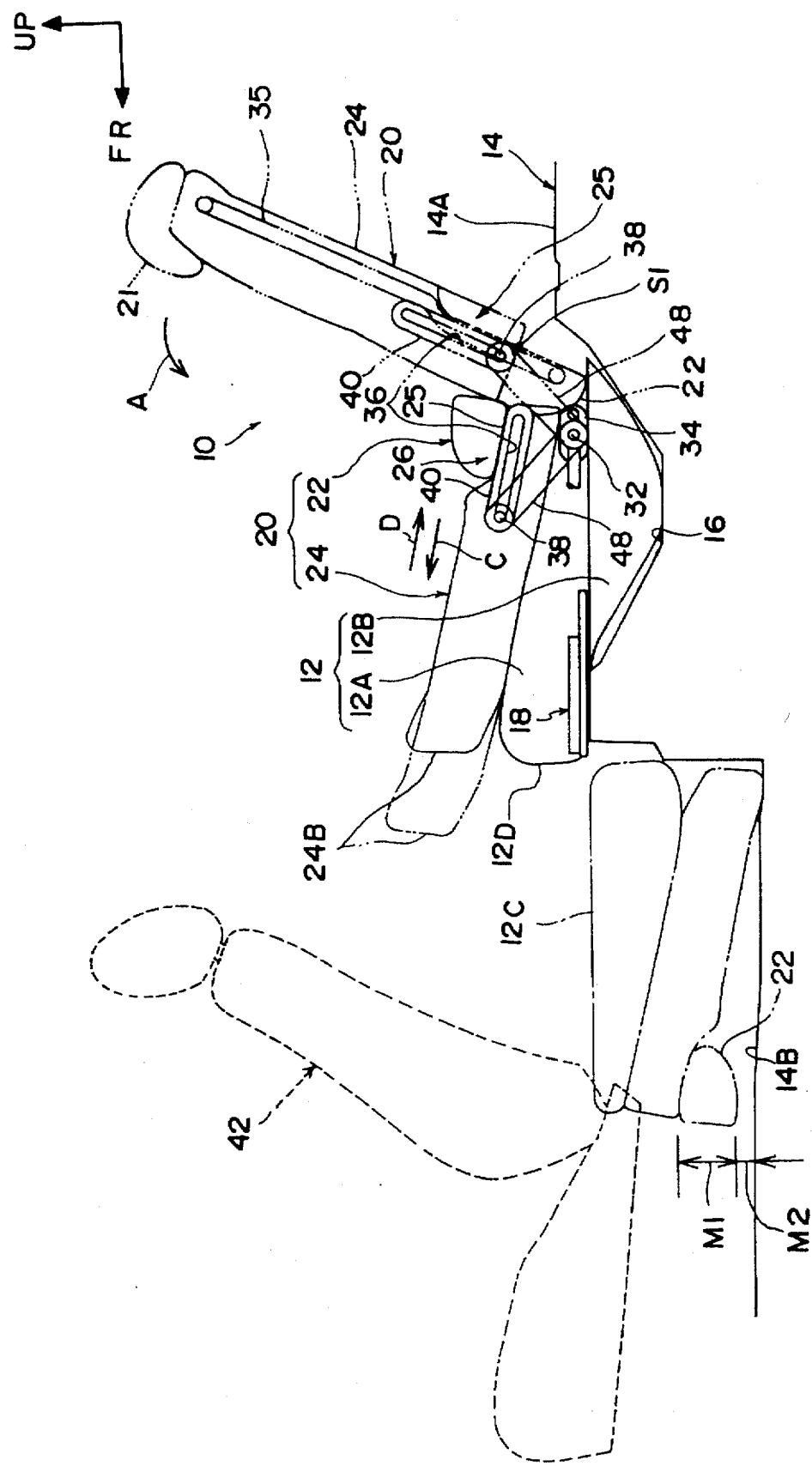
FIG. 1 is a schematic side view illustrating a rear seat device for a vehicle relating to an embodiment of the present invention.

As shown in FIG. 1, a rear seat cushion 12 of a rear seat 10 of the present embodiment is disposed on a floor surface 14A which is the portion of a stepped floor 14 which is provided toward the rear of the vehicle and is the higher portion. The rear seat cushion 12 is divided into a rear seat cushion main body portion 12A, which is provided above the floor surface 14A, and a rear seat cushion divisional portion 12B, which is provided below the floor surface 14A.

The rear seat cushion main body portion 12A is mounted to the front end portion of the floor surface 14A via a rotating/sliding mechanism 18. When the rear seat cushion main body portion 12A is rotated toward the front of the vehicle by the rotating/sliding mechanism 18, the rear seat cushion divisional portion 12B remains in a recess 16 formed in the floor surface 14A.

A front seat 42 is moved slightly toward the front of the vehicle from the position shown by the broken line, and the rear seat back 20 is rotated forward from an ordinary seating state to a state in which the rear seat back 20 is superposed on the rear seat cushion main body portion 12A. Thereafter, the rear seat back 20 and the rear seat cushion main body portion 12A are rotated 180 degrees toward the front of the vehicle by the rotating/sliding mechanism 18 so as to assume the state illustrated by the one-dot-chain line in FIG. 1. In this state, the rear seat cushion main body portion 12A and the rear seat back 20 are moved onto the front section floor surface 14B which is the portion of the stepped floor 14 which is provided toward the front of the vehicle and is the lower portion. A reverse surface 12C of the rear seat cushion main body portion 12A is thereby positioned at substantially the same height as the floor surface 14A.

In the rear seat 10 of the present embodiment, as illustrated by the two-dot-chain line in FIG. 1, the rear seat back 20 is longer than the rear seat cushion main body portion 12A.

Figure 2:
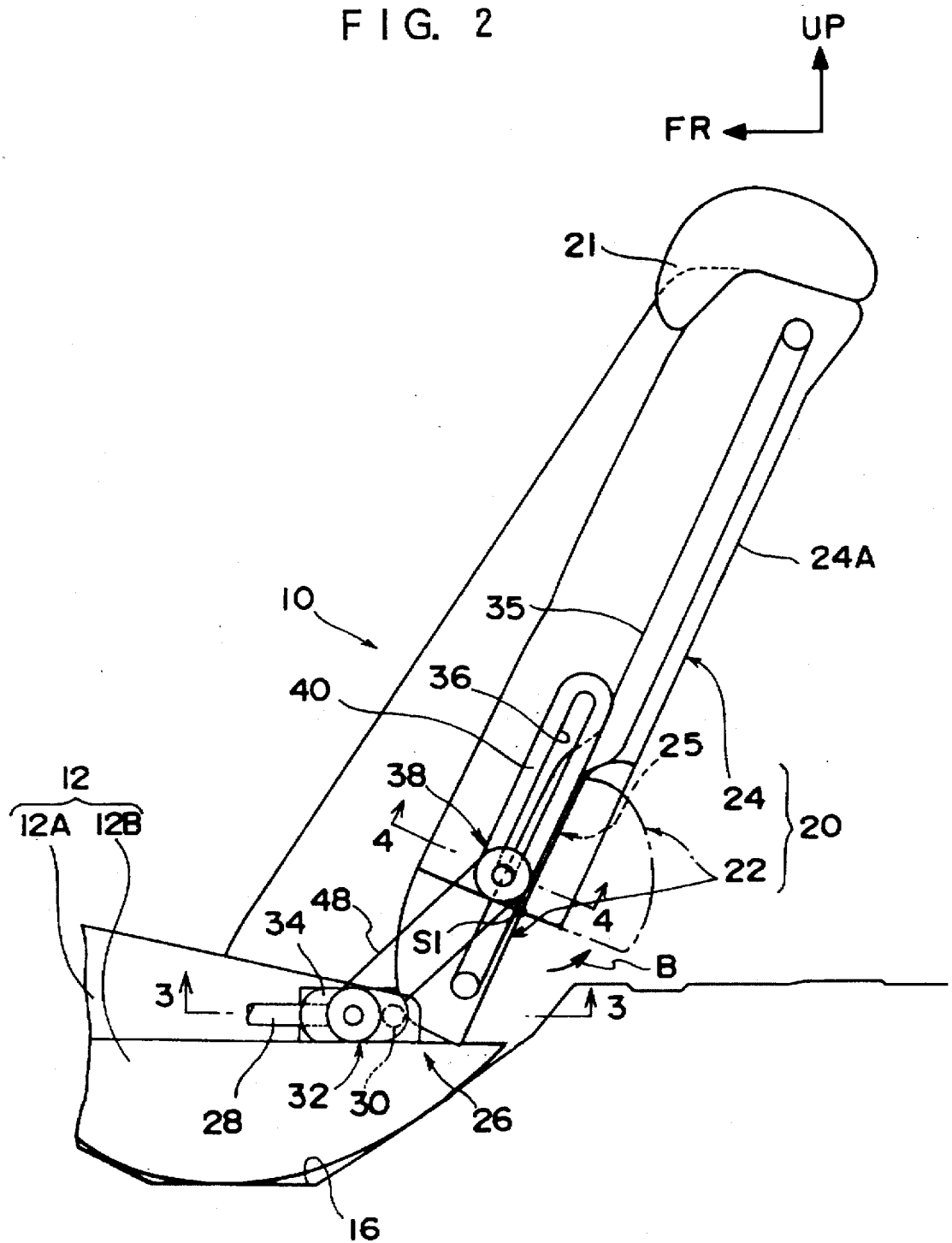
FIG. 2 is a schematic side view illustrating a portion of the rear seat device for a vehicle relating to the embodiment of the present invention.

As shown in FIG. 2, the rear seat back 20 is divided, at the lower portion thereof, into a longitudinal direction lower portion and a longitudinal direction upper portion which are a rear seat back divisional portion 22, which serves as a seat back lower portion, and a rear seat back main body portion 24, which serves as a seat back upper portion. The rear seat back divisional portion 22 is connected so as to be rotatable toward the rear of the vehicle (in the direction of arrow B in FIG. 2) around a bottom end S1 of the outer covering portion of a back surface 24A (the surface toward the rear of the vehicle) of the rear seat back main body portion 24, which outer covering portion is provided so as to be continuous with the outer covering portion of a back surface (the surface toward the rear of the vehicle) of the rear seat back divisional portion 22. Namely, the lower end S1 serves as a hinge portion for the rotation of the rear seat back divisional portion 22 toward the front of the vehicle.

A recess 25 is formed beneath the back surface 24A of the rear seat back main body portion 24. The rear seat back divisional portion 22 is stored in the recess 25 as illustrated by the one-dot-chain line in FIG. 2.

The rear seat back main body portion 24 is connected to the rear seat cushion main body portion 12A by a rear seat back rotating/sliding mechanism 26. The rear seat back main body portion 24 is movable to a state in which the rear seat back main body portion 24 is collapsed forward so as to be superposed on the rear seat cushion main body portion 12A (i.e., the state illustrated by the solid line in FIG. 1), and is slidable in longitudinal directions of the vehicle (in the directions of arrows C and D in FIG. 1).

Figure 3:
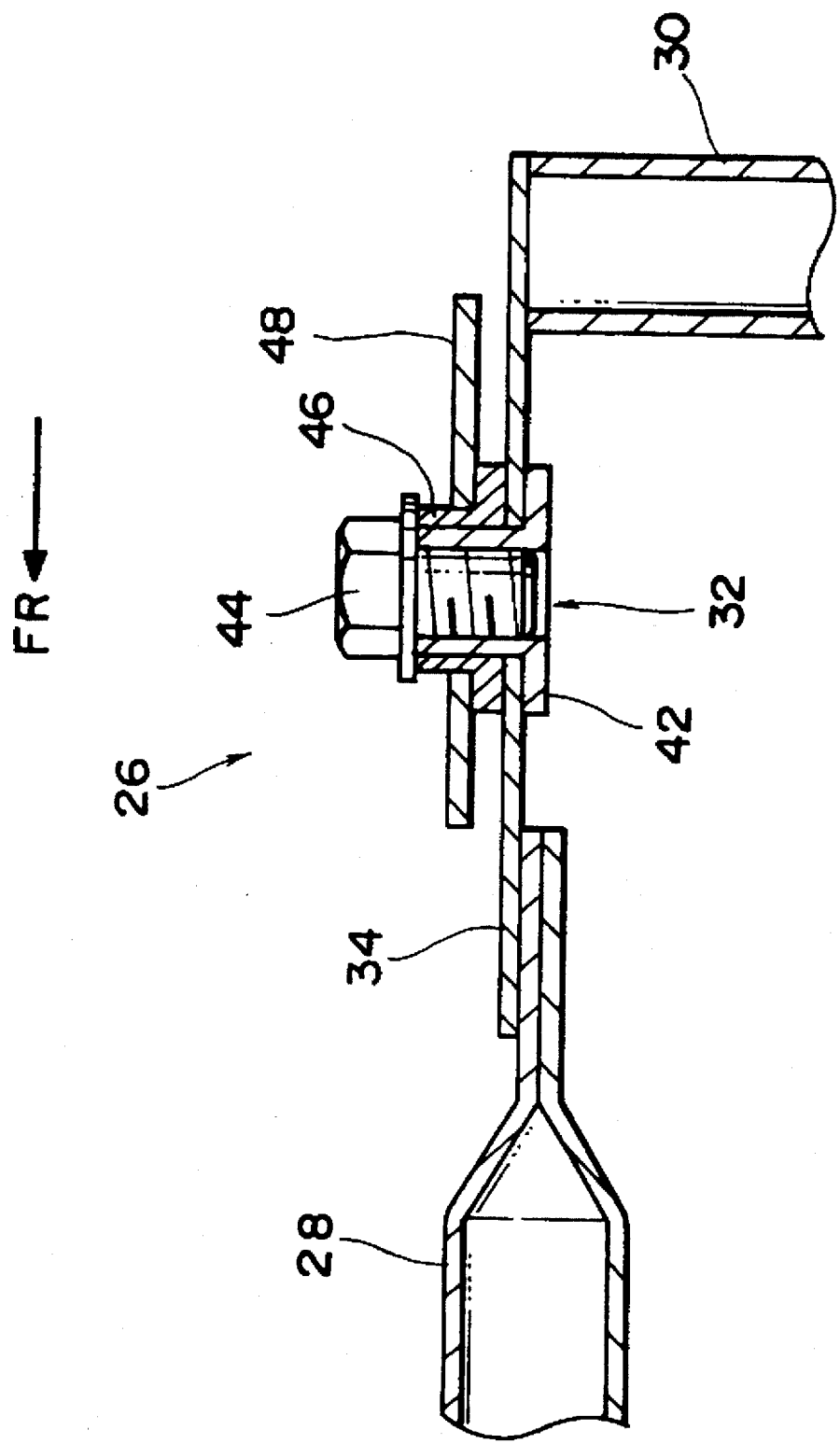
FIG. 3 is an enlarged sectional view taken along line 3—3 of FIG. 2.

As illustrated in FIG. 3, the rear seat back rotating/sliding mechanism 26 is fixed to frames 28, 30 of the rear seat cushion main body portion 12A. The rear seat back rotating/sliding mechanism 26 is equipped with a bracket 34 which serves as a connecting member and which has a rotating shaft 32 along the transverse direction of the vehicle.

Figure 4:
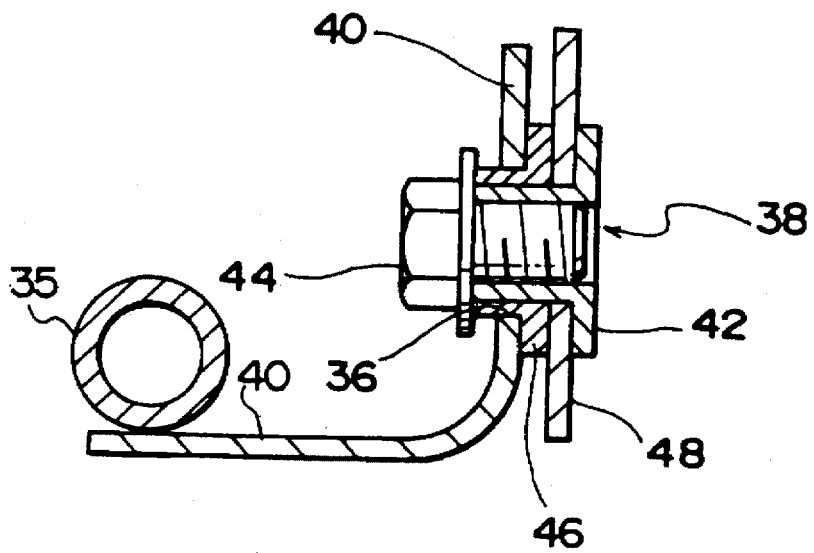
FIG. 4 is an enlarged sectional view taken along line 4—4 of FIG. 2.
Figure 5:
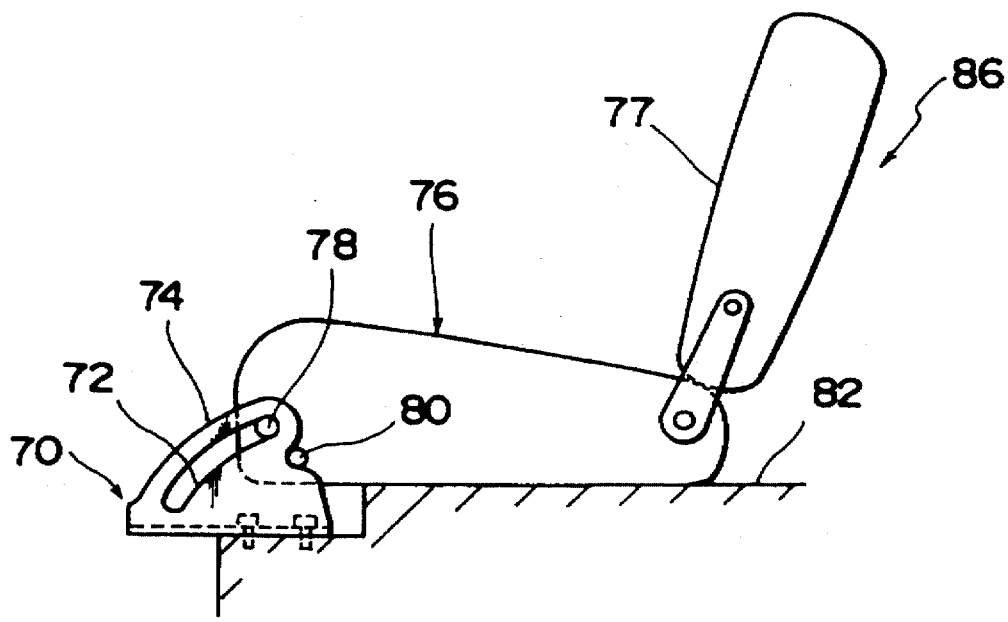
FIG. 5 is a schematic side view illustrating an ordinary seating state of a rear seat device for a vehicle relating to a conventional example.
Figure 6:
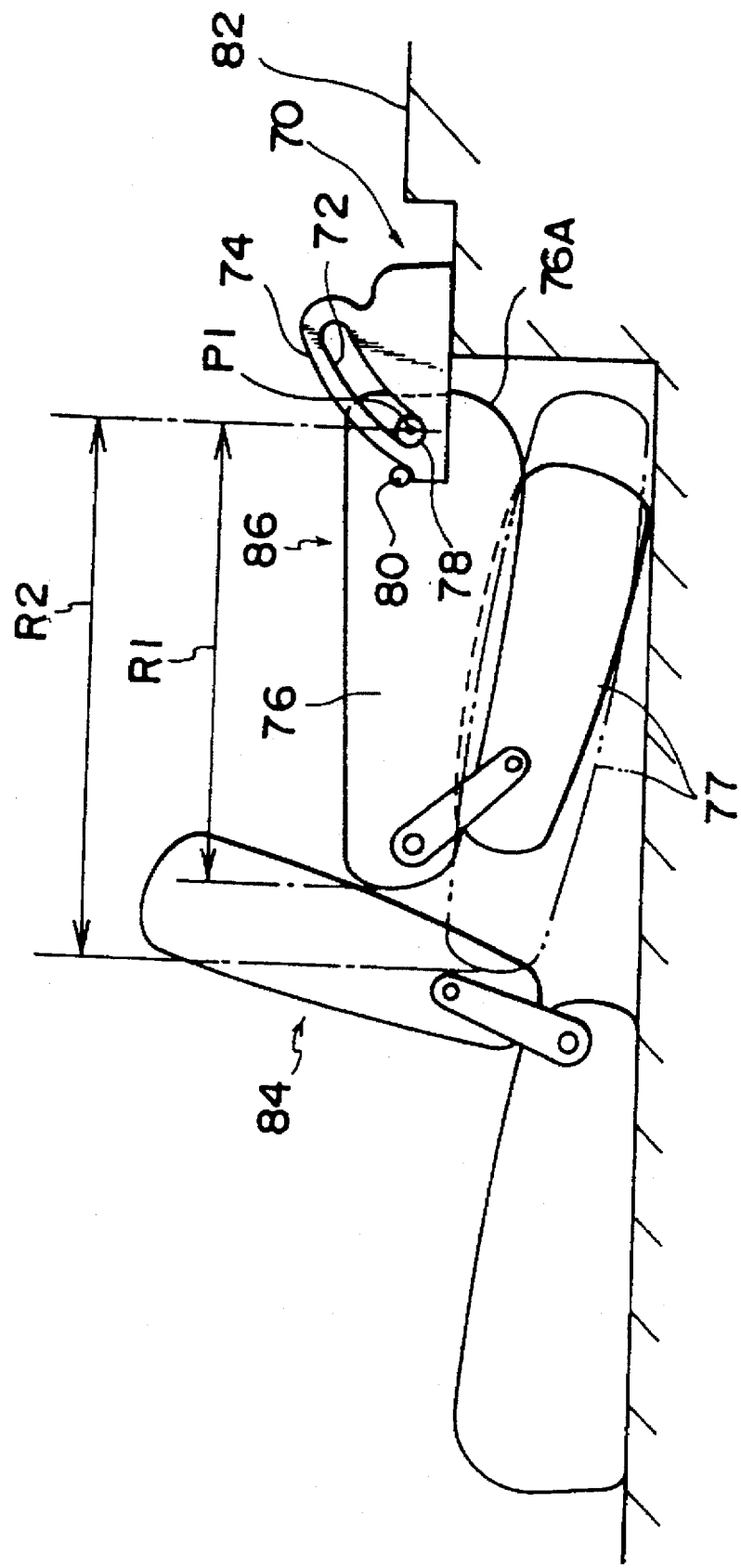
FIG. 6 is a schematic side view illustrating a state in which the rear seat device for a vehicle relating to the conventional example is rotated substantially 180 degrees toward the front of a vehicle.

As shown in FIG. 4, the rear seat back rotating/sliding mechanism 26 is fixed to a frame 35 of the rear seat back, and includes an elongated hole 36 serving as a guide portion and a link arm 48 having a rotating shaft 38 which is movably inserted into the elongated hole 36.

The rotating shaft 32 and the rotating shaft 38 are respectively structured by a T-nut 42 and a bolt 44 which is screwed with the T-nut 42. A link arm 48 is connected via a bush 46 to the T-nut 42 of the rotating shaft 32, whereas a bracket 40 is connected via a bush 46 to the T-nut 42 of the rotating shaft 38.

Accordingly, as illustrated by the solid line in FIG. 1, the rear seat back main body portion 24 and the rear seat back divisional portion 22, which has been moved into the recess 25 formed in the lower portion of the back surface 24A of the rear seat back main body portion 24, are collapsed forward onto the rear seat cushion main body 12A by the rear seat back rotating/sliding mechanism 26, and the rear seat back 20 is slid in the direction of arrow D (i.e., to the state illustrated by the solid line in FIG. 1) by the rear seat back rotating/sliding mechanism 26. In this way, the respective positions in the longitudinal direction of the vehicle of distal ends 24B, 12D of the rear seat back main body portion 24 and the rear seat cushion main body portion 12A, respectively, can be aligned.

As shown by the one-dot-chain line in FIG. 1, in the state in which the rear seat 20 is rotated substantially 180 degrees toward the front of the vehicle from the state illustrated by the solid line, the rear seat back divisional portion 22 is interposed between the rear seat back main body portion 24 and the floor surface 14B. As a result, by changing the thickness M1 of the rear seat back divisional portion 22, the gap M2 between the rear seat 10 and the floor surface 14B can be eliminated.

Reference numeral 21 in FIGS. 1 and 2 is a head rest. The head rest 21 is mounted to the rear seat back main body portion 24 so as to be attachable thereto and removable therefrom.

The rear seat cushion main body 12A and the rear seat back 20 are each divided into two portions at the right and the left (i.e., in the transverse direction of the vehicle) at the driver's seat side and the front passenger's seat side (e.g., are divided into two at a dimensional ratio of 6:4 for left and right). In the upright state in which the rear seat cushion main body 12A and the rear seat back 20 of the driver's seat side are rotated substantially 90 degrees to the front, the rear seat cushion main body portion 12A and the rear seat back 20 at the front passenger's seat side can be placed in an upright state of being rotated substantially 90 degrees to the front or in a folded-up state of being rotated substantially 180 degrees toward the front.

Next, operation of the present embodiment will be described.

In the rear seat device for a vehicle of the present embodiment, the rear seat back divisional portion 22, which forms the bottom portion of the rear seat back 20, is rotated toward the rear of the vehicle (in the direction of arrow B in FIG. 2) with the bottom end S1 of the outer covering portion of the reverse surface 24A of the rear seat back main body portion 24 serving as a hinge portion. The rear seat back divisional portion 22 is thereby set at the position illustrated by the one-dot-chain line in FIG. 2. Further, due to the rear seat back rotating/sliding mechanism 26, the rear seat back 20 is collapsed forward onto the rear seat cushion main body portion 12A.

At this time, the link arm 48 of the rear seat back rotating/sliding mechanism 26 swings around the rotating shaft 32 and the rotating shaft 38, so as to move from the state shown by the three-dot-chain line in FIG. 1 (the usual seating state) to the position illustrated by the solid line. In the forward collapsed state of the rear seat back main body portion 24, the distal end portion 24B of the rear seat back main body portion 24 projects further toward the front of the vehicle than the rear seat cushion main body portion 12A as illustrated by the two-dot-chain line in FIG. 1.

Accordingly, in this state, when the rear seat back 20 is pushed in the direction of arrow D, the rotating shaft 38 moves in the direction of arrow D along the elongated hole 26 of the bracket 40. Therefore, the rear seat back main body portion 24 which has been collapsed forward onto the rear seat cushion main body portion 12A moves in the direction of arrow D, so that both of the distal end portions 12D and 24B are aligned. More specifically, because the rear seat back main body portion 24 is moved to the solid line position, the entire length of the rear seat 10 can be shortened.

As a result, the rear seat device for a vehicle of the present embodiment can be applied to small automobiles in which the interval between the front seat 42 and the rear seat 10 is not overly large. By rotating the rear seat back 20 180 degrees toward the front of the vehicle from the state in which the rear seat back 20 is collapsed forward onto the rear seat cushion main body portion 12A, a wide, flat luggage compartment can be provided from behind the rear seat 10 to the reverse surface 12C of the rear seat cushion main body portion 12A.

Further, in the rear seat device for a vehicle of the present embodiment, as illustrated by the one-dot-chain line in FIG. 1, in the state in which the rear seat back 20 is rotated substantially 180 degrees toward the front, the rear seat back divisional portion 22 is interposed between the rear seat back main body portion 24 and the floor surface 14B. Therefore, by changing the thickness M1 of the rear seat back divisional portion 22, the gap M2 between the rear seat 10 and the floor surface 14B can be eliminated. As a result, the rear seat 10 in the state of having been rotated substantially 180 degrees toward the front of the vehicle can be directly supported by the floor surface 14B. Therefore, there is no need to provide, between the rear seat 10 and the floor surface 14B, a supporting member for supporting the rear seat 10.

Details of specific embodiments of the present invention have been described herein. However, the present invention is not limited to these embodiments. It will be clear to those skilled in the art that other various embodiments within the scope of the invention are possible.

What is claimed is:

1. A rear seat device for use in a vehicle having a stepped floor surface, with said rear seat device adapted to be disposed on a higher, rear section of the vehicle, said rear seat device being constructed and adapted to be rotatable by substantially 180 degrees toward a front of the vehicle, said rear seat device comprising:

a rear seat back whose length is adjustable between a seating state length, which is the length of said rear seat back in an ordinary seating state for a vehicle occupant, and a folded-up state length, which is shorter than the seating state length, wherein said rear seat back is divided into two portions in a longitudinal direction thereof which are an upper portion, which is a rear seat back main body portion, and a lower portion, which is a rear seat back divisional portion, and said rear seat back divisional portion is provided so as to be rotatable around a shaft, which extends in a transverse direction of said rear seat back, with respect to said rear seat back, main body portion, and a rear seat back rotating/sliding mechanism which allows said rear seat back main body portion to collapse forward onto a rear seat cushion and allows said rear seat back main body portion to selectively slide with respect to the rear seat cushion in substantially a longitudinal direction of the rear seat cushion from the forward collapsed state.

2. A rear seat device for use in a vehicle according to claim 1, wherein said rear seat back rotating/sliding mechanism has a guide member, which is provided at said rear seat back main body portion, and a connecting member, which connects the rear seat cushion and said rear seat back and is guidable by said guide member.

3. A rear seat device for use in a vehicle according to claim 2, wherein said connecting member has a link member, and a vicinity of one end portion of said link member is provided so as to be able to move while the vicinity of the one end portion of said link member is being guided by said guide member.

4. A rear seat device for use in a vehicle according to claim 3, wherein said link member has a screw member which movably fixes the vicinity of the one end portion of said link member to said guide member.

5. A rear seat device for use in a vehicle according to claim 3, wherein a vicinity of another end portion of said link member is rotatably fixed to a frame provided at the rear seat cushion.

6. A rear seat device for use in a vehicle according to claim 5, wherein said connecting member has a screw member which fixes the vicinity of the other end portion of said link member to the frame.

7. A rear seat device for use in a vehicle according to claim 3, wherein said guide member has an elongated hole which guides the vicinity of the one end portion of said link member.

8. A rear seat device for use in a vehicle according to claim 1, wherein the shaft which extends in the transverse direction of said rear seat back is provided at a surface of said rear seat back at a rear side thereof, and said rear seat back divisional portion is adapted to be rotatable toward a rear of the vehicle.

9. A rear seat device for use in a vehicle having a stepped floor surface, with said rear seat device adapted to be disposed on a higher, rear section of the vehicle, said rear seat device being constructed and adapted to be rotatable by substantially 180 degrees toward a front of the vehicle, the rear seat device comprising:

a rear seat back whose length is adjustable between a seating state length, which is the length of said rear seat back in an ordinary seating state for a vehicle occupant, and a collapsed state length, which is shorter than the seating state length, said rear seat back being divided into two portions in a longitudinal direction thereof which are an upper portion, which is a rear seat back main body portion, and a lower portion, which is a rear seat back divisional portion, said rear seat back divisional portion and said rear seat back main body portion being connected at vicinities of respective surfaces thereof at a rear side in the ordinary seating state for a vehicle occupant, and said rear seat back divisional portion being adapted to be rotatable toward a rear of the vehicle around a shaft, which extends in a transverse direction of said rear seat back with respect to said rear seat back main body portion; and a rear seat back rotating/sliding mechanism which allows said rear seat back main body portion to collapse forward onto a rear seat cushion and allows said rear seat back main body portion to selectively slide with respect to the rear seat cushion in substantially a longitudinal direction of the rear seat cushion from a forward collapsed state.

10. A rear seat device for use in a vehicle according to claim 9, wherein said rear seat back rotating/sliding mechanism has a guide member, which is provided at said rear seat back main body portion, and a connecting member, which connects the rear seat cushion and said rear seat back and is guidable by said guide member.

11. A rear seat device for use in a vehicle according to claim 10, wherein said connecting member has a link member, and a vicinity of one end portion of said link member is provided so as to be able to move while the vicinity of the one end portion of said link member is being guided by said guide member.

12. A rear seat device for use in a vehicle according to claim 11, wherein said link member has a screw member which movably fixes the vicinity of the one end portion of said link member to said guide member.

13. A rear seat device for use in a vehicle according to claim 12, wherein a vicinity of another end portion of said link member is rotatably fixed to a frame provided at the rear seat cushion.

14. A rear seat device for use in a vehicle according to claim 13, wherein said connecting member has a screw member which fixes the vicinity of the other end portion of said link member to the frame.

15. A rear seat device for use in a vehicle according to claim 11, wherein said guide member has an elongated hole which guides the vicinity of the one end portion of said link member.

16. A rear seat device for use in a vehicle having a stepped floor surface, with said rear seat device adapted to be disposed on a higher, rear section of the vehicle, said rear seat device being constructed and adapted to be rotatable by substantially 180 degrees toward a front of the vehicle, said rear seat device comprising:

a rear seat back whose length is adjustable between a seating state length, which is the length of said rear seat back in an ordinary seating state for a vehicle occupant, and a collapsed state length, which is shorter than the seating state length, said rear seat back being divided into two portions in a longitudinal direction thereof which are an upper portion, which is a rear seat back main body portion, and a lower portion, which is a rear seat back divisional portion, said rear seat back divisional portion and said rear seat back main body portion being connected at vicinities of respective surfaces thereof at a rear side in the ordinary seating state for a vehicle occupant, and said rear seat back divisional portion being adapted to be rotatable toward a rear of the vehicle around a shaft, which extends in a transverse direction of said rear seat back, with respect to said rear seat back main body portion; and a rear seat back rotating/sliding mechanism which allows said rear seat back main body portion to collapse forward onto a rear seat cushion and allows said rear seat back main body portion to selectively slide with respect to the rear seat cushion in substantially a longitudinal direction of the rear seat cushion from a forward collapsed state, said rear seat back rotating/sliding mechanism having a guide member provided at said rear seat back main body portion and having an elongated hole, and having a connecting member connecting the rear seat cushion and said rear seat back, and said connecting member having a link member, and a vicinity of one end portion of said link member being provided so as to be movable while being guided by said elongated hole, and a vicinity of another end portion of said link member being rotatably fixed to a frame provided at the rear seat cushion.

17. A rear seat device for use in a vehicle according to claim 16, wherein said link member has a screw member which movably fixes the vicinity of the one end portion of said link member to said guide member.

18. A rear seat device for use in a vehicle according to claim 16, wherein said connecting member has a screw member which fixes the vicinity of the other end portion of said link member to the frame.

* * * * *